Jan. 25, 1955 G. C. HERSCHELL 2,700,403
PANEL CORE ASSEMBLING MACHINE
Filed July 1, 1952 5 Sheets-Sheet 5
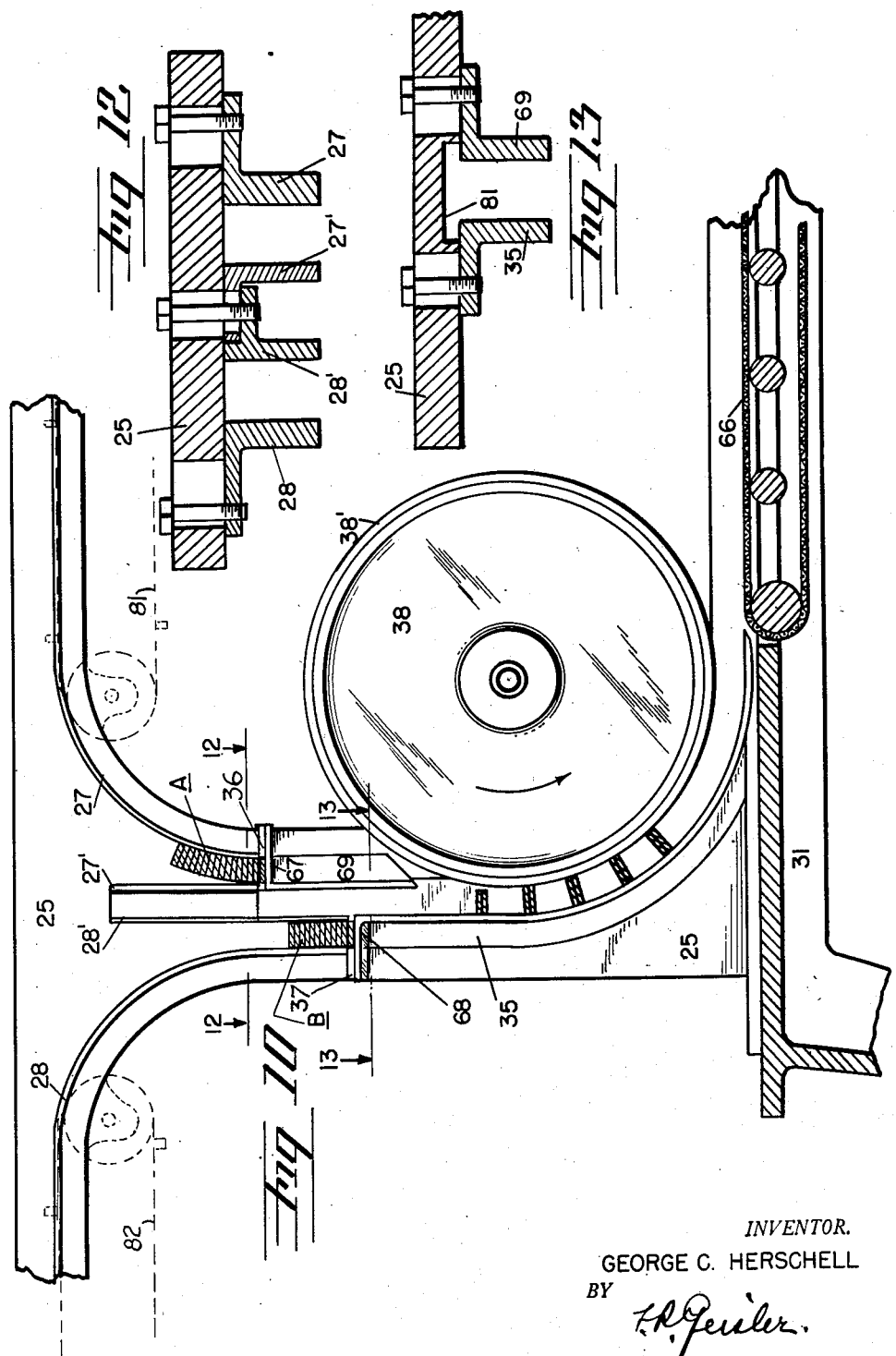
INVENTOR.
GEORGE C. HERSCHELL
BY
ATTORNEY

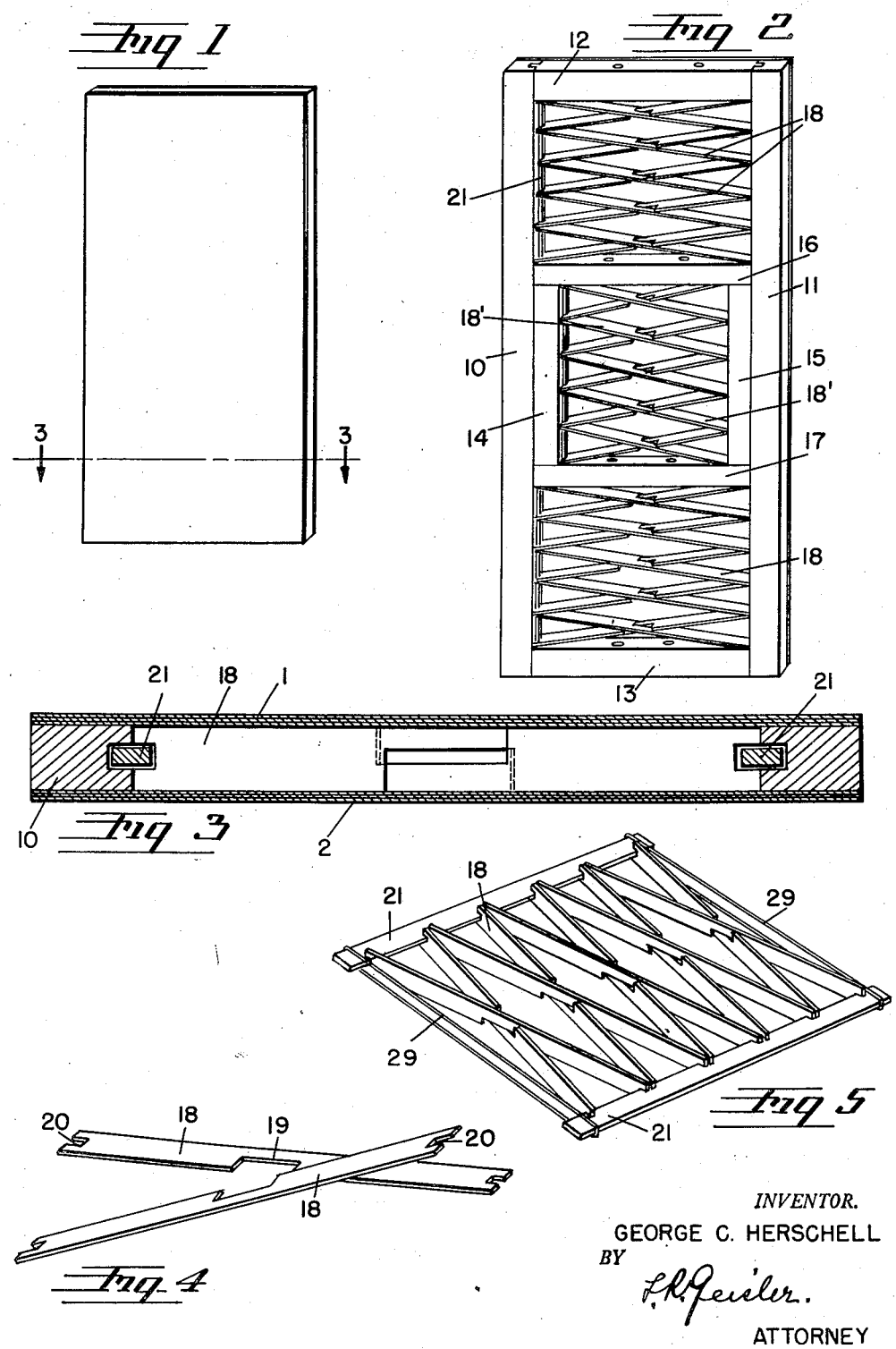

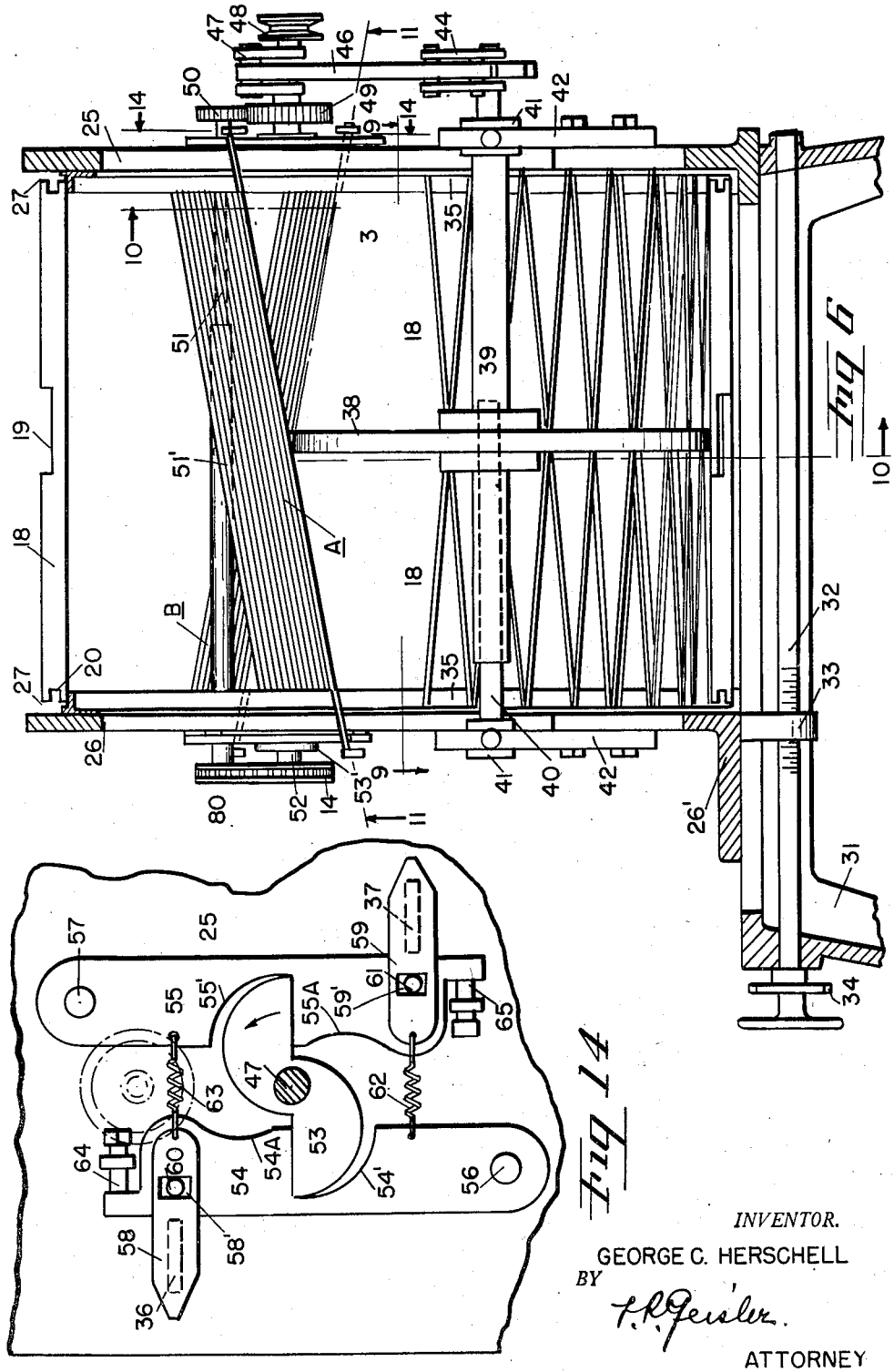

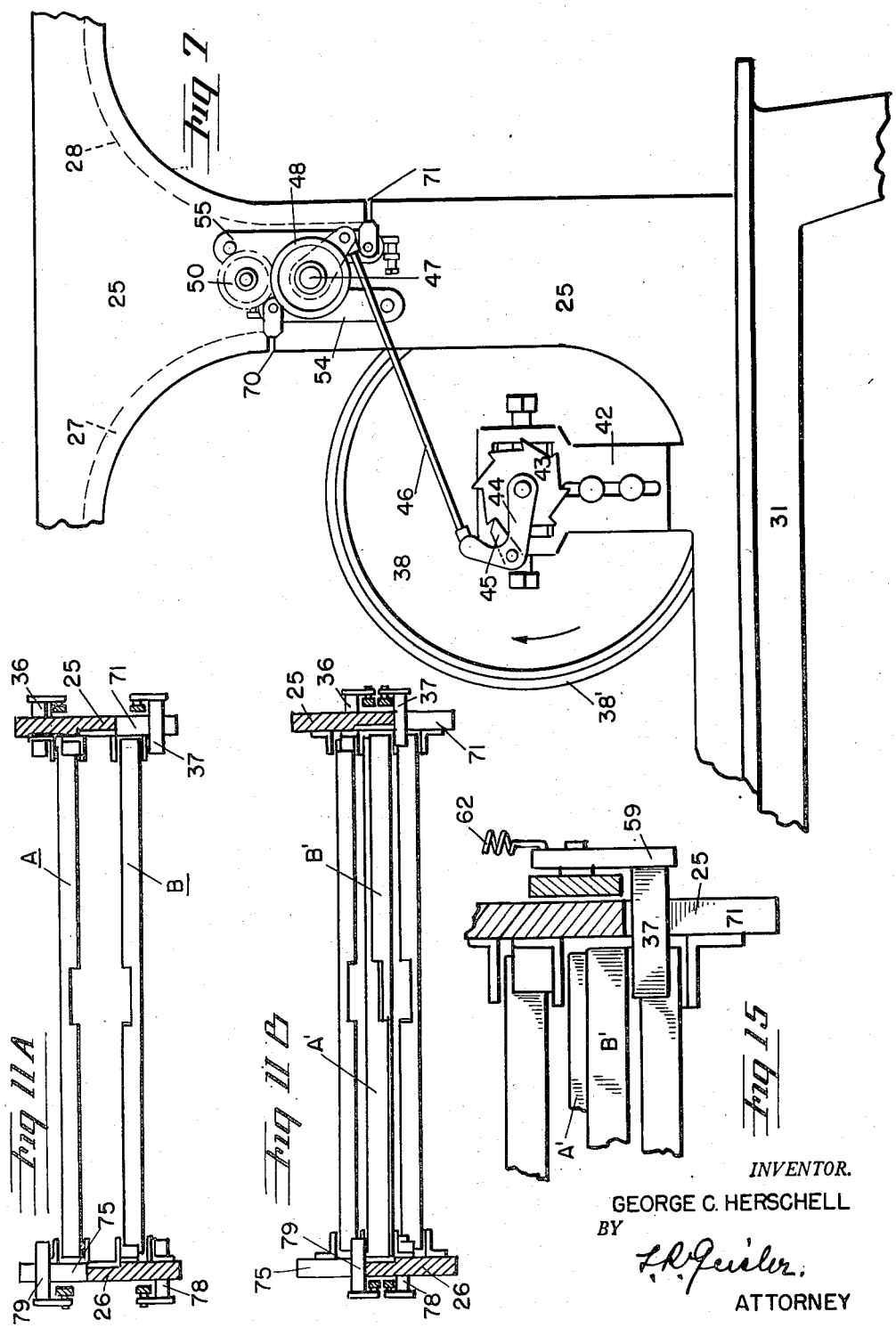

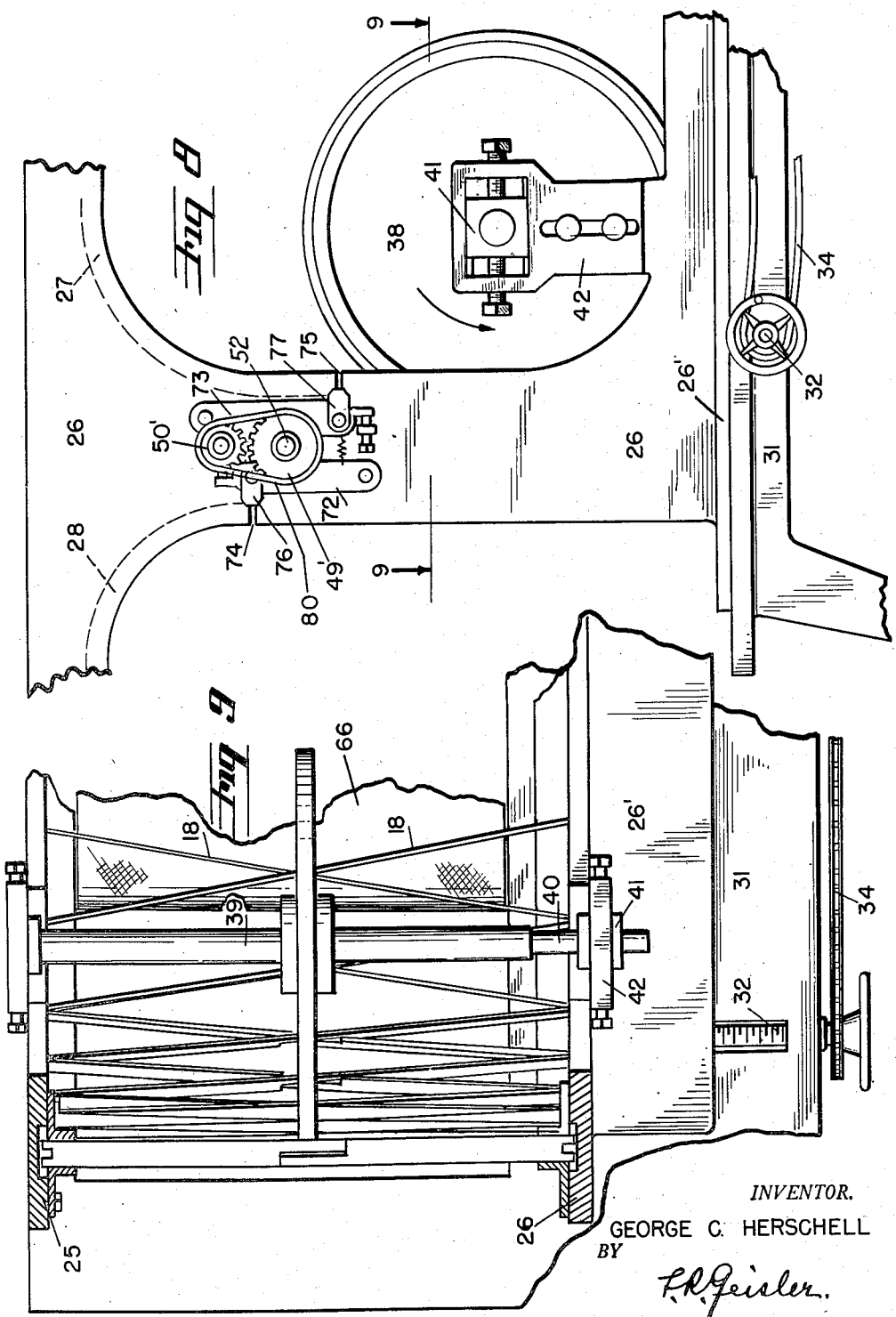

United States Patent Office 2,700,403
Patented Jan. 25, 1955

2,700,403

PANEL CORE ASSEMBLING MACHINE

George C. Herschell, Portland, Oreg.

Application July 1, 1952, Serial No. 296,663

8 Claims. (Cl. 144—2)

This invention relates to a core structure for hollow panels, especially hollow panel doors, wherein the core structure comprises pairs of crossed slats with the surfacing board sheets being secured to the edges of the crossed slats.

More specifically, the present invention relates to the assembling of slats in core formation for use in the fabricating of panel doors of the type described in my application for patent on improvement in "Hollow Core Panel," Serial No. 296,664, filed under date of July 1, 1952.

Heretofore when core structures comprising individual slats have been used in hollow panel doors and the like it has been the practice to set up the core by arranging the slats in place by hand. When a considerable number of prefabricated slats are used for a core, such as the core in the improved door construction described in my above mentioned copending application, the necessary manual labor involved restricts the speed with which such panel doors can be manufactured even with experienced workmen, and is a large factor in the cost of manufacture.

The object of the present invention is to provide a machine by which prefabricated notched slats can be assembled and arranged in crossed position and in core formation, so as to constitute a core section of desired size, without any manual handling of the separate individual slats.

Another object of the invention is to provide an improved machine which will be capable of assembling and arranging the slats in desired core formation much more rapidly than would be possible with even the most skilled manual labor.

An additional object of the invention is to provide a machine of the nature above indicated which will be relatively simple in construction, and the operation and control of which will not necessitate any special skill on the part of the operator.

The manner in which these objects and incidental advantages are attained with my machine, the structure of the machine and the method of operation, will be explained briefly in the following description in which reference is to be made to the accompanying drawings.

In the drawings:

Fig. 1 is a perspective view of a hollow panel door of the type having an interior core structure;

Fig. 2 is a perspective view of the same door, drawn to a slightly larger scale, but with the near side surfacing board sheet removed in order to show the interior core construction;

Fig. 3 is an enlarged section taken on line 3—3 of Fig. 1;

Fig. 4 is a perspective view of a pair of core slats showing the same slightly separated for the sake of clarity;

Fig. 5 is a core section composed of several pairs of crossed slats, as delivered from my assembling machine and slide on to end-engaging strips;

Fig. 6 is a front sectional elevation of the machine;

Fig. 7 is a fragmentary side elevation taken from the right of Fig. 6;

Fig. 8 is a corresponding similar fragmentary elevation taken from the opposite side of the machine and thus from the left of Fig. 6;

Fig. 9 is a fragmentary plan section taken on line 9—9 of Fig. 6 and Fig. 8;

Fig. 10 is a vertical section corresponding to line 10—10 of Fig. 6;

Figs. 11A and 11B are sections taken on line 11—11 of Fig. 6 and illustrating the positions of a pair of slats during two successive intervals in the operation of the machine;

Figs. 12 and 13 are sections on lines 12—12 and 13—13 respectively of Fig. 10, looking in the respective directions indicated by the arrows but drawn to an enlarged scale and with the slats in the slots omitted for clarity;

Fig. 14 is an enlarged sectional elevation on line 14—14 of Fig. 6; and

Fig. 15 is an enlarged fragmentary section taken on the same line, 11—11, of Fig. 6, as Figs. 11A and 11B, and corresponding in part to Fig. 11B.

The hollow panel door of Figs. 1, 2 and 3, as described more fully in my above mentioned copending application, includes a frame composed of two main stiles 10 and 11 (Fig. 2) top and bottom rails 12 and 13, intermediate inner auxiliary stiles 14 and 15 providing the necessary wood depth for a lock at either side of the door, and cross rails 16 and 17. Thus the resulting door frame comprises three panels, the center panel being narrower than the top and bottom panels. A series of pairs of crossed core slats 18 is provided at each of the top and bottom panels and a similar series of crossed core slats 18' is provided for the center panel. All the core slats are of uniform width corresponding exactly to the thickness of the frame members, so that the plywood face sheets 1 and 2 for the two door faces can be secured to the corresponding edges of the core slats throughout the full length of the slats as well as to the door frame members.

The core slats 18 and 18' are each formed with a center notch 19 (Fig. 4) permitting the slats of each pair to cross each other with their lateral edges extending in the same planes respectively. The stiles 10, 11, 14 and 15 of the door frame have a center longitudinal groove on their inner edge to accommodate holding strips 21 for the core slats, and each core slat is formed with a slot 20 in each end for engagement with the strips 21.

The object of the present invention, as previously mentioned, is to provide a machine for assembling and arranging the core slats 18 or 18' in groups of crossed pairs so that an assembled group, of proper size, can be set in each of the three panels in the door as these panels are formed by the placing of the frame members in position in the fabrication of the door.

Referring now to Figs. 6, 7, 8, 9 and 10, my assembling machine includes a pair of main side frames 25 and 26 which are mounted on a suitable supporting base platform 31. One of the side frames, thus side frame 25, is rigidly secured to the base 31. The other side frame 26 is laterally adjustable on the base in order to vary the distance between the two side frames and thus to enable the machine to be adjusted to handle core slats of various lengths. The side frame 26 has a bottom flange 26' (Fig. 6) which accordingly is slidable laterally on the top of the base 31, and a pair of downwardly-extending brackets, one of which is shown at 33 in Fig. 6, extend into transverse slots located in the top of the base. An adjusting screw shaft extends through and threadingly engages each of these downwardly-extending brackets 33, the corresponding adjusting screw shaft 32 for one of these brackets being shown in Fig. 6. A hand wheel is secured to the outer end of each adjusting screw shaft and the screw shafts are connected by a sprocket chain 34 which engages sprockets secured on the shafts so as to cause the two adjusting screw shafts to rotate always in unison.

Two pairs of guide tracks 27 and 28 (Figs. 6 and 10) are provided at the top of the machine for supporting the ends of the core slats which are supplied to the machine in two groups. One track of each pair is mounted at the top of each of the side main frames. Thus the pair of tracks 27 lead from a conveyor belt (diagrammatically indicated at 81 in Fig. 10) in front of the top of the machine into the machine, while the other pair of tracks 28 lead similarly from a conveyor belt (diagrammatically indicated at 82 in Fig. 10) at the rear of the top of the machine into the machine. Supplies of identical core slats 18 are delivered into the machine via each pair of tracks. The core slats are placed on the tracks with their center notches 19 upwardly as shown at the top in Fig. 6.

As illustrated in Fig. 10, the tracks 27 and 28 on each of the main side frames curve downwardly into the machine and terminate in vertically-extending portions which are adjustably attached to the main side frames by bolts extending through horizontal slots in the side frames (see Fig. 12). Cooperating guide members 27' and 28', which form guide channels with the end portions of the tracks 27 and 28 respectively, are similarly adjustably secured to the side frames and this adjustable mounting enables the machine to be adjusted for core slats of various widths. The spacing between the guide members 27' and 28' and the spacing between the member 27' and the bottom end of track 27, and between member 28' and the bottom end of track 28 will be slightly greater than the width of the core slats 18. Thus the guide channels at the inner terminations of the tracks 27 and 28 in the machine each receive a supply of core slats indicated at A and B in Fig. 10, and the slats in group A will all have their center notches 19 faced towards the group B and those in group B will all be faced towards the group A.

Rest supports 67 and 68 are mounted at the lower terminals of the tracks 27 and 28 respectively in each of the main side frames, and, as shown in Fig. 10, these rest supports are spaced below the bottom ends of the guide members 27' and 28' respectively a distance approximately equal to the thickness of one slat. The reason for this will be presently explained. Preferably, but not necessarily, the rest support 67 is formed as a top flange on intermediate guide section 69, and the rest support 68 is formed as a top flange on a central lower main track 35.

It will be noted from Fig. 10 that the terminals of tracks 27 and 28, and thus the corresponding rest supports 67 and 68, are located at different heights on the side frame 25. This is true also of the terminals of the tracks 27 and 28 and corresponding rest supports on the other side frame 26, but, as will be apparent also from Fig. 10, the terminal from the track 27 on the side frame 25 is at the upper level and the terminal for track 28 at the lower level, whereas, on the side frame 26 (Fig. 6), the levels are reversed and the track 27 terminates at the lower level and the track 28 at the upper level. Consequently when the two groups of slats which are delivered along the tracks 27 and 28 and which are indicated at A and B are held by their respective rest supports their positions will be as illustrated in Fig. 6, and the center notch of each slat in one group will be opposite the center notch of the corresponding slat in the other group.

A central lower main track 35 (Figs. 6 and 10) is mounted on each of the side frames 25 and 26 and extends from an upper vertical position in vertical alignment with the guide member 28' down through approximately a 90° arc to a final lower horizontal position on the base support 31. By mechanically operated means, which will be described later, the bottom slat of group A, held on the pair of rest supports 67, and the bottom slat of group B, held on the pair of rest supports 68, are simultaneously thrust towards each other and caused to drop down together into the central channel and along the main track 35. In order to permit the bottom slats of group A and group B to be pushed into the center channel from off their rest supports 67 and 68 respectively, the rest supports 67 and 68 are spaced a slight distance below the bottom ends of the guide members 27' and 28' respectively and also for a reason to be explained later, below the termination of the respective tracks 27 and 28. When these two bottom slats of groups A and B are thrust towards each other from their respective rest supports their central notches 19 will cross each other and the end walls of each notch will engage the opposite faces of the other slat, which engagement will maintain the slats in a position of angularity with each other and thus the two slats will drop down together in desired crossed position. To facilitate the downward movement of the pair of crossed slats the side frames 25 and 26 are grooved, as shown at 81 in Fig. 13 to avoid any possibility of either end of either slat being temporarily restrained by contact with either of the side frames.

A slat-engaging wheel 38 is centrally located in the machine in the relative positions shown in Figs. 6 and 10. The wheel 38 is keyed on a telescoping drive shaft which is composed of outer and inner telescoping members 39 and 40, and the ends of these shaft members are journaled in bearing blocks 41 (see Fig. 8), which bearing blocks are adjustably carried in members 42 supported on the side frames 25 and 26. The periphery of the wheel 38 is provided with a soft tire or ring 38', for example a ring of sponge rubber or similar soft resilient material, and the wheel 38 is so positioned that as each pair of crossed slats drops into the lower main tracks 35 the pair will be engaged by the wheel 38 and moved down along the tracks 35 as a result of rotation of the wheel (in counterclockwise direction as viewed in Fig. 10).

The wheel 38 is given a succession of short, partial rotations in synchronism with the operation of the means causing the slats of each pair to be thrust from their respective delivery channels and dropped together onto the lower central tracks 35. It will be apparent from Figs. 6 and 9 that if the pairs of crossed slats were not controlled by the wheel 38 in their downward travel they might have a tendency to assume less regular positions, with one end or the other being retarded by engagement with one of the tracks. Thus the engagement of the slats by the wheel 38 at the center and the predetermined controlled intermittent rotation of the wheel 38, as each pair of crossed slats is dropped down on the lower tracks 35, causes the successive pairs of slats to be moved along by the intermittent movement of the wheel, until the pairs of crossed slats reach a moving endless belt 66 (Fig. 10) by which they are carried along in horizontal direction away from the wheel.

As the pairs of crossed slats are carried along on the conveyor belt 66 the operator slips a pair of wooden strips 21 (Figs. 2, 3 and 5), of the desired length for a door panel, into the slots 20 at the opposite ends of the slats respectively, and then, by holding the strips 21 in his hands, the operator lifts the engaged group of slats from the conveyor belt 66. The group of crossed slats thus obtained may be immediately set in place in the door frame which is being assembled, or the operator may slip rubber bands such as shown at 29 in Fig. 5 over the ends of the pair of strips 21 and the slat assembly can then be set aside and kept until needed for door construction. No handling of the individual pairs of crossed slats is required by the operator at any time.

A short crank shaft 47 (Figs. 6 and 7) is rotatably supported in bearings in the side frame 25. A driving pulley 48 is secured to the outer end of the crank shaft 47, and a V belt (not shown) connects this pulley 48 with a motor or with any other power operated means by which the entire machine is operated. A ratchet wheel 43 (Fig. 7) is secured on the end of the shaft which carries the slat-moving wheel 38. A pawl carrier 44 is pivotally mounted on the shaft at both sides of the ratchet wheel and carries a pawl 45 as shown in Fig. 7. A link 46 connects the pawl carrier 44 with the crank of the crank shaft 47. Thus rotation of the crank shaft 47, counterclockwise as viewed in Fig. 7, will produce intermittent partial rotations of the slat-moving wheel 38 in the same direction.

A double cam element 53 (Fig. 14), having two opposite substantially semi-circular cam edges, is secured to the crank shaft 47 adjacent the outside face of the side frame 25. A pair of cam-actuated arms 54 and 55 are pivotally mounted on the outside of the frame 25 on the pivot pins 56 and 57 respectively. These arms 54 and 55 have cut-out sections 54' and 55' to accommodate the double cam element 53 when the latter is in the position illustrated in Fig. 14, and have concaved edge portions 54A and 55B adjacent the cut-out sections respectively for engagement with the curved edges of the cam element as the cam element rotates. A pair of members 58 and 59 are loosely mounted on the arms 54 and 55 respectively by means of the respective pins 60 and 61 which are secured in the arms and which extend through enlarged slots 58' and 59' in the members 58 and 59. Thus the members 58 and 59 are similarly mounted on the free ends of the arms 54 and 55 and are oppositely positioned due to the fact that the arms 54 and 55 are oppositely positioned. A coil spring 62 connects the arm 54 with the member 59 of the other arm, and similarly coil spring 63 connects the arm 55 with the member 58 on arm 54. Adjustable stops 64 and 65 are mounted on the side frame 25 to limit the swings of the arms 54 and 55 under the pull of the coil springs. Each of the stops 64 and 65 consists of a screw member mounted in a threaded block secured to the side frame of the machine.

From Fig. 14 it will be apparent that as the shaft 47 and the double cam element 53 are rotated (counterclockwise) the arms 54 and 55 will be moved in opposite directions against the force of the springs 62 and 63 until the double cam element has rotated through 180°, whereupon the arms 54 and 55 will immediately snap back into vertical position against their respective stops 64 and 65.

The side frame 25 of the machine has a pair of horizontal slots 70 and 71 (Fig. 7) which extend through the side frame and terminate in the spaces between the bottom ends of the tracks 27 and 28 and rest supports 67 and 68, and the slat pushers 36 and 37, secured to the members 58 and 59 respectively (Fig. 14) extend through these slots respectively (Fig. 10). These slat pushers engage a side of the ends of the slats resting on the supports 67 and 68. The purpose of these slat pushers is to thrust the corresponding ends of the slats off their respective rest supports 67 and 68 so that these slats will drop down onto the central tracks 35 (see Fig. 10).

A gear 49 (Fig. 6), secured on the crank shaft 47, meshes with a gear 50. The gear 50 is secured to one end of a splined telescoping shaft which extends across the machine and is journaled in the frame sides 25 and 26. This shaft consists of the two parts 51 and 51'. A sprocket wheel 50' (Fig. 8) is secured to the opposite end of the shaft on the outside of the frame side 26, and this sprocket wheel 50' is connected by a sprocket chain 80 (Fig. 8) to a sprocket wheel 49' which is secured on a stub shaft 52 (Figs. 6 and 8) which extends outwardly from and is rotatably supported in the frame side 26. The diameters of the sprocket wheels 50' and 49' have the same ratio as those of the gears 50 and 49 and thus the stub shaft 52 rotates at the same speed as the crank shaft 47. A second double cam element (indicated at 53' in Fig. 6), identical to cam element 53 shown in Fig. 14, is secured on this stub shaft 52.

A second pair of arms 72 and 73 (Fig. 8) identical to the arms 54 and 55 (Fig. 14) previously described, are mounted in the same manner on the outer face of the frame side 26 in the same relative position with respect to the second double cam element 53'. The frame side 26 has a pair of slots 74 and 75 (Fig. 8), corresponding to the slots 71 and 70 (Fig. 7) and similarly terminating in the spaces between the bottom ends of the tracks 28 and 27 and the corresponding rest supports (not shown) which are located on the inside of the frame side 26. The arms 72 and 73 carry members 76 and 77 respectively (Fig. 8) similar to the members 58 and 59 (Fig. 14) and similarly mounted, and slat pushers 78 and 79 are carried by the members 76 and 77 respectively (Figs. 11A and 11B) and extend through the slots 74 and 75 respectively.

Since the double cam elements 53 and 53' on the outside of the frame sides 25 and 26 rotate at the same speed it will now be apparent from Figs. 6, 7 and 8 that the pairs of arms 54, 55 and 72, 73, and the slat pushers connected to them, will operate simultaneously and intermittently to thrust the two bottom slats from the two groups A and B from their rest supports and cause these two bottom slats to drop down together on to the tracks 35. The operation of the slat pushers 36, 37 and 78, 79 is illustrated in Figs. 11A, 11B, and 15. In Fig. 11A the pair of slat pushers on each side of the machine are shown spaced the maximum distance apart while the two double cam elements, in engagement with the corresponding pairs of arms, have pushed these arms to outward position against the force of the respective coil springs. At the instant the two double cam elements have completed 180° of rotation the two pairs of cam actuated arms will snap back to the vertical position illustrated in Fig. 14, causing the two pairs of slat pushers to thrust the two bottom slats from their respective rest supports, and the slat pushers will then be in the position illustrated in Figs. 11B and 15. The two slats which have been pushed from their rest supports in this manner are shown at A' and B' and are thus dropped down together in crossed position. Then as the slat pushers again move to the position of Fig. 11A they will move out from under the next slat of each group and these next slats will drop on to the rest supports from which they in turn will be thrust by the slat pushers as soon as the double cam elements complete another 180° rotation, and so on.

Thus, with the operation of my machine, pairs of crossed slats will be dropped down at intermittent intervals into contact with rim of the central wheel 38, and the rotation of the latter will move each crossed pair of slats down to the traveling belt on the machine platform. The operator, in the manner previously explained, lifts the desired number of pairs from the traveling belt through the medium of a pair of holding strips 21.

I claim:
1. In a machine for handling identical, centrally notched core slats, a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined, a lower slat-assembling guideway leading downwardly in said side frames below the space between said pairs of rests, pairs of elements movable on said rests respectively for thrusting the bottom slat on each pair of rests into the space between said pairs of rests, and means operating said pairs of elements simultaneously to cause two opposed slats to be discharged towards each other into said space, whereby the notches of said two discharged slats will engage each other in crossed position and said discharged crossed slats will drop down together into said lower guideway.

2. In a device of the character described for handling identical, centrally notched core slats, a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined but with the longitudinal center portions of corresponding slats on said pairs of rests positioned at the same height, means for guiding slats onto one pair of rests and similar means for guiding slats onto the other pair of rests with the notches of the two groups of slats opposed to each other, a lower slat-assembling guideway leading downwardly in said side frames below the space between said pairs of rests, pairs of pushers movable on said rests respectively for thrusting the bottom slat on each pair of rests into the space between said pairs of rests, and means operating said pairs of pushers simultaneously to cause two opposed slats to be discharged towards each other into said space, whereby the notches of said two discharged slats will engage each other in crossed position and said discharged crossed slats will drop down together into said lower guideway.

3. In a device of the character described for handling identical, centrally notched core slats, a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined but with the longitudinal center portions of corresponding slats on said pairs of rests positioned at the same height, means for delivering slats onto one pair of rests and similar means for delivering slats onto the other pair of rests with the notches of the two groups of slats opposed to each other, a lower-slat-assembling guideway leading downwardly in said side frames below the space between said pairs of rests, pairs of elements movable on said rests respectively for thrusting the bottom slat on each pair of rests into the space between said pairs of rests, means operating said pairs of elements simultaneously to cause two opposed slats to be discharged towards each other into said space, whereby the notches of said two discharged slats will engage each other in crossed position and said discharged crossed slats will drop down together into said lower guideway, and a slat-engaging wheel mounted on a horizontal shaft and centrally positioned between said side frames, the radius of said wheel being slightly greater than the distance of said wheel shaft from said lower guideway, whereby each pair of slats upon dropping down in said lower guideway will encounter said wheel periphery and then be moved along in said guideway by the rotation of said wheel.

4. In a device of the character described for handling identical, centrally notched core slats, a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests, and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined but with the longitudinal center portions of corresponding slats on said pairs of rests positioned at the same height, means for delivering slats onto one pair of rests and similar means for delivering slats onto the other pair of rests with the notches of the two groups of slats opposed to each other, a lower slat-assembling guideway leading downwardly in said side frames below the space between said pairs of rests, pairs of pushers movable on said rests respectively for thrusting the bottom slat on each pair of rests into the space between said pairs of rests, means operating said pairs of pushers simultaneously to cause two opposed slats to be discharged towards each other into said space, whereby the notches of said two discharged slats will engage each other in crossed position and said discharged crossed slats will drop down together into said lower guideway, a slat-engaging wheel mounted on a horizontal shaft and centrally positioned between said side frames, said wheel having a periphery of slat-engageable material, the radius of said wheel being slightly greater than the distance of said wheel shaft from said lower guideway, whereby each pair of slats upon dropping down in said lower guideway will encounter said wheel periphery and then be moved along in said guideway by the rotation of said wheel, and means for rotating said wheel with the operation of said pushers.

5. The combination set forth in claim 2 with one pair of said rests being adjustably mounted in said side frames respectively for varying the spacing between the two groups of slats on said pairs of rests for slats of various widths.

6. The combination set forth in claim 3 with one of said side frames adjustable laterally with respect to the other and with said wheel adjustably located to enable slats of various lengths to be handled in said device.

7. A panel core assembling machine for handling identical, centrally notched core slats including a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined, means for delivering slats onto one pair of rests and similar means for delivering slats onto the other pair of rests with the notches of the two groups of slats opposed to each other, a lower slat-assembling guideway leading downwardly in said side frames below the space between said pairs of rests, pair of pushers movable on said rests respectively for thrusting the bottom slat on each pair of rests into the space between said pairs of rests, means operating said pairs of pushers simultaneously to cause two opposed slats to be discharged towards each other into said space, whereby the notches of said two discharged slats will engage each other in crossed position and said discharged crossed slats will drop down together into said lower guideway, a slat-engaging wheel mounted on a horizontal shaft and centrally positioned between said side frames, said wheel having a periphery of soft slat-engageable material, the radius of said wheel being slightly greater than the distance of said wheel shaft from said lower guideway, whereby each pair of slats upon dropping down in said lower guideway will encounter said wheel periphery and then be moved along in said guideway by the rotation of said wheel, said guideway leading to the discharging section of said machine and means connected with said operating means for said pushers for producing intermittent partial rotation of said wheel.

8. A panel core assembling machine for handling identical, centrally notched core slats including a pair of side frames laterally spaced from each other, a pair of slat end rests located on said frames respectively, one of said rests being positioned at a greater height than the other, a second pair of slat end rests located respectively on said frames in a vertical plane parallel to the vertical plane of said first mentioned pair of rests and spaced therefrom a distance slightly greater than the width of the slats, the rests in said second pair positioned at the same heights as said first pair but oppositely arranged so as to cause slats with their ends supported on said first pair of rests and slats similarly supported on said second pair of rests to be oppositely inclined, means for delivering slats onto one pair of rests and similar means for delivering slats onto the other pair of rests with the notches of the two groups of slats opposed to each other, a lower-slat-assembling guideway leading downwardly in said side frames below the space between said pairs of rests, pairs of pushers movable on said rests respectively for thrusting the bottom slat on each pair of rests into the space between said pairs of rests, means operating said pairs of pushers simultaneously to cause two opposed slats to be discharged towards each other into said space, whereby the notches of said two discharged slats will engage each other in crossed position and said discharged crossed slats will drop down together into said lower guideway, a slat-engaging wheel mounted on a horizontal shaft and centrally positioned between said side frames, said wheel having a periphery of resilient slat-engageable material, the radius of said wheel being slightly greater than the distance of said wheel shaft from said lower guideway, whereby each pair of slats upon dropping down in said lower guideway will encounter said wheel periphery and then be moved along in said guideway by the rotation of said wheel, the lower portion of said guideway being curved to correspond for a short distance to the periphery of said wheel, said guideway leading to the discharging section of said machine, a conveyor belt at the discharging end of said guideway, and means for rotating said wheel intermittently with the operation of said pushers.

References Cited in the file of this patent

UNITED STATES PATENTS

| 1,354,424 | Sliger | Sept. 28, 1920 |
| 1,553,509 | Coffeen | Sept. 15, 1925 |
| 1,564,843 | Fulton | Dec. 8, 1925 |
| 1,966,878 | Bluzat | July 17, 1934 |